(12) United States Patent
Zhang

(10) Patent No.: US 9,178,572 B1
(45) Date of Patent: Nov. 3, 2015

(54) INTEGRATED RADIO FREQUENCY OR NEAR FIELD COMMUNICATIONS ANTENNA

(71) Applicant: Amazon Technologies, Inc., Reno, NV (US)

(72) Inventor: Zhibin Zhang, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 129 days.

(21) Appl. No.: 14/034,556

(22) Filed: Sep. 24, 2013

(51) Int. Cl.
*H04B 1/38* (2015.01)
*H04B 5/00* (2006.01)
*G02F 1/13* (2006.01)
*H01Q 1/24* (2006.01)

(52) U.S. Cl.
CPC ............ *H04B 5/0081* (2013.01); *G02F 1/1313* (2013.01); *H01Q 1/243* (2013.01)

(58) Field of Classification Search
USPC ................ 455/566, 575.1, 571, 575.7, 226.1; 345/174, 173, 179, 55
See application file for complete search history.

(56) References Cited

U.S. PATENT DOCUMENTS

| 2010/0194697 | A1* | 8/2010 | Hotelling et al. | 345/173 |
| 2011/0147059 | A1* | 6/2011 | Ma et al. | 174/258 |
| 2012/0050217 | A1* | 3/2012 | Noguchi et al. | 345/174 |
| 2012/0105362 | A1* | 5/2012 | Kremin et al. | 345/174 |
| 2013/0069894 | A1* | 3/2013 | Chen et al. | 345/173 |
| 2014/0028619 | A1* | 1/2014 | Huang et al. | 345/174 |
| 2014/0066130 | A1* | 3/2014 | Yang et al. | 455/566 |

\* cited by examiner

*Primary Examiner* — Ganiyu A Hanidu
(74) *Attorney, Agent, or Firm* — Novak Druce Connolly Bove + Quigg LLP

(57) ABSTRACT

Systems and approaches integrate a radio frequency (RF) or near field communications (NFC) antenna with a display and/or touch component of an electronic device. The device can be incorporated with RF or NFC technology without having to increase the thickness of the device. The RF or NFC antenna can be formed during fabrication of the display and/or touch component, which can result in simpler manufacturing processes. One or more segments of the RF or NFC antenna can each be formed from a single or multiple scan/signal lines of the display component and/or a single or multiple drive/sense lines of the touch component. Additional circuitry can be added during manufacture of the display and/or touch component to enable the device to switch between a mode of operation for display and touch and a mode of operation for RF or NFC.

20 Claims, 7 Drawing Sheets

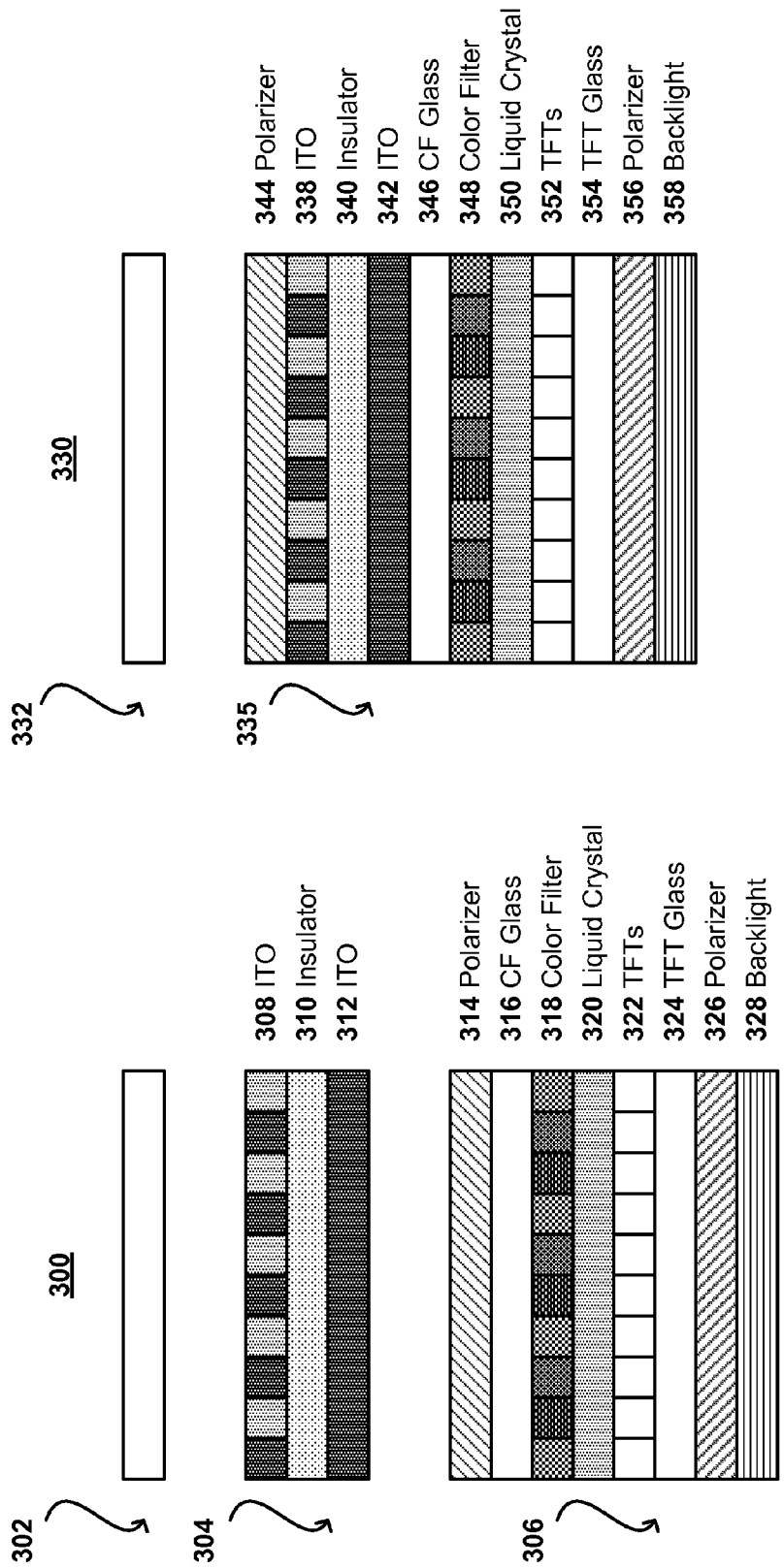

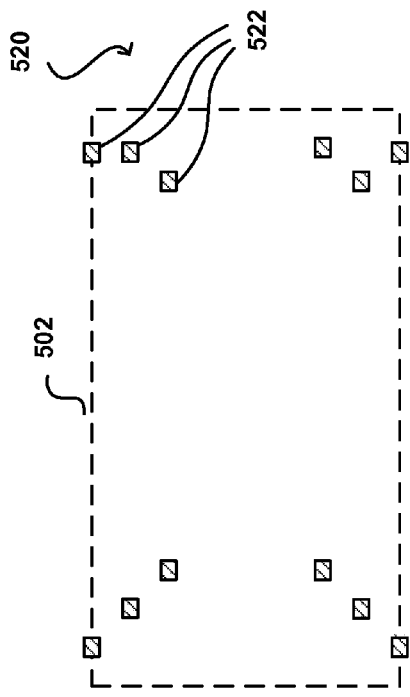
FIG. 5A
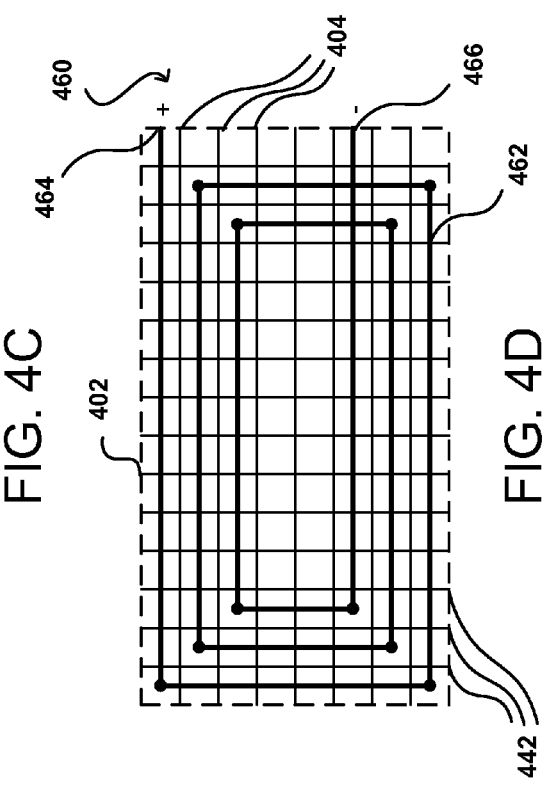
FIG. 5B
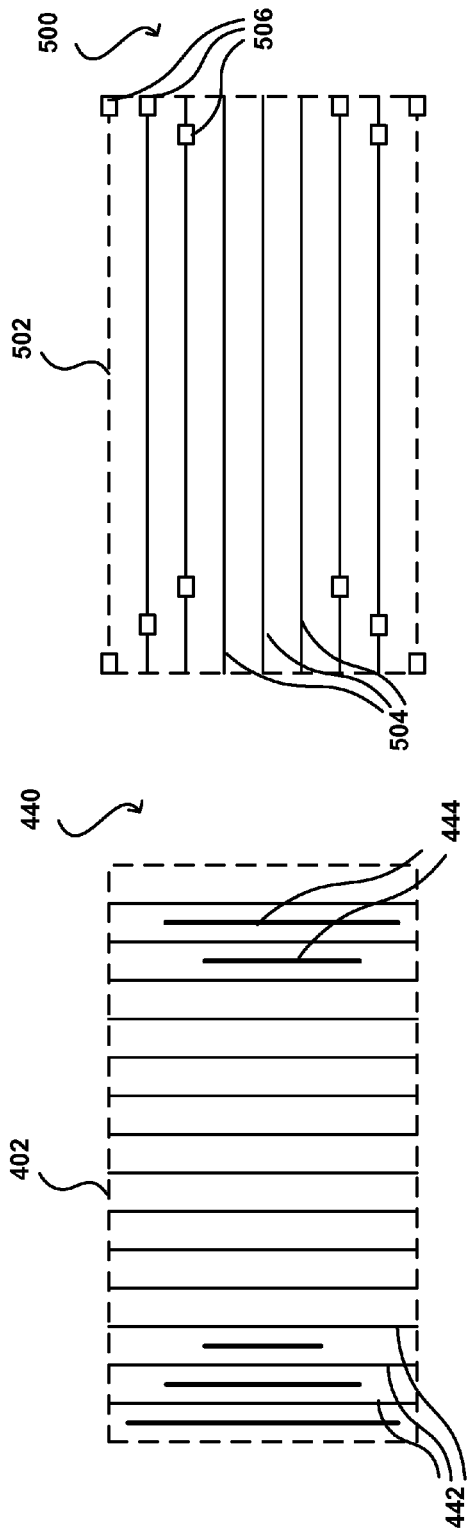
FIG. 4C
FIG. 4D

INTEGRATED RADIO FREQUENCY OR NEAR FIELD COMMUNICATIONS ANTENNA

BACKGROUND

Radio frequency identification (RFID) or near field communications (NFC) is a technology enabling a personal electronic device, such as a laptop computer, tablet, or smartphone, to establish wireless communications with another RFID- or NFC-enabled tag, device, or system, such as a smart poster, another personal electronic device, or POS terminal, by touching or bringing the personal electronic device into close proximity with the other RFID- or NFC-enabled tag, device, or system. RFID or NFC has certain advantages over other approaches to short range wireless communication. For example, RFID or NFC technology typically consumes very little power relative to other short distance wireless standards. In addition, the close proximity required to connect two RFID- or NFC-enabled devices can be useful in situations where many other devices are within the vicinity and potentially causing interference with wireless communications in the area. RFID or NFC technology also enables for quick connections between devices, usually no more than milliseconds, while other short distance wireless protocols may take up to several seconds to establish inter-device connection. Further, connecting two RFID- or NFC-enabled devices usually requires no manual setup. These characteristics of RFID or NFC make the technology suitable for applications such as electronic payment and ticket processing, security and identity authentication, face-to-face social networking, smart posters, bootstrapping for other modes of wireless communication, among others. As a result of its various benefits, RFID/NFC technology is becoming increasingly common in personal electronic devices.

BRIEF DESCRIPTION OF THE DRAWINGS

Various embodiments in accordance with the present disclosure will be described with reference to the drawings, in which:

FIGS. 3A-3C illustrate configurations for a display component and touch component of an electronic device that can be used in accordance with various embodiments;

FIGS. 4A-4D illustrate an example approach for integrating an RF or NFC antenna with a display component or touch component of an electronic device in accordance with an embodiment;

FIGS. 5A-E illustrates an example approach for integrating an RF or NFC antenna with a display component or touch component of an electronic device in accordance with an embodiment;

DETAILED DESCRIPTION

Figure 1:
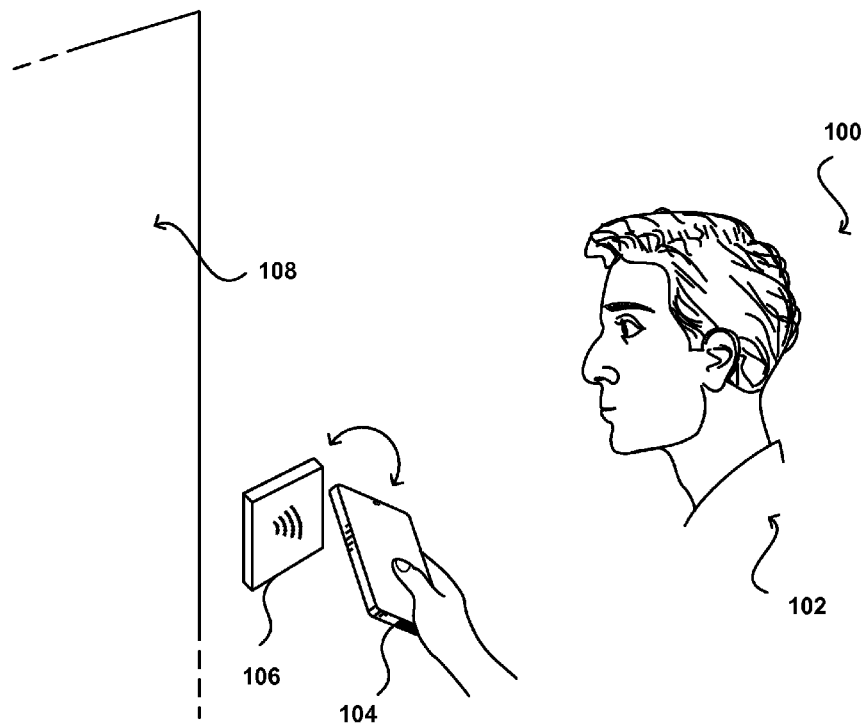
FIG. 1 illustrates an example approach of inter-device communication using RF or NFC technology in accordance with an embodiment.

Although many advantages can be derived from a personal electronic device incorporating RFID or NFC technology, one potential drawback is the expense of additional physical components and manufacturing processes necessary to enable RFID or NFC. Further, users often prefer thin, lightweight electronic devices because of the enhanced portability such devices can provide. This design goal can be compromised with the additional hardware and other components necessary to support RFID/NFC. In particular, incorporating a conventional radio frequency (RF) or NFC antenna and related materials can increase the thickness of the device by several hundred microns. RFID/NFC operates according to magnetic field induction in an RF band such as 13.56 MHz. To generate an electromagnetic field sufficient to induce a signal that can be read by another device and to meet the performance requirements of standards bodies such as NFC Forum, EMVCo, GlobalPlatform, ETSI/Smart Card Platform (SCP), among others, the RF or NFC antenna may occupy as much surface area as a device allows. The conventional RF or NFC antenna generally comprises a planar coil structure, and may be formed from copper tracing and be disposed on a substrate. In certain conventional devices, RF or NFC antennas are positioned towards the back of electronic devices, which are typically metallic for purposes of increasing mechanical strength and modulating thermal conditions of the devices. But the conductive properties of the metal housing of the devices can degrade the electromagnetic field generated by the RF or NFC antenna. To overcome this effect, conventional devices may incorporate a ferrite layer between the back cover of the device and the antenna. This approach, however, increases the thickness of the device. In other conventional devices, an RF or NFC antenna may be placed directly behind a display or touch component of the device. Such an approach may also result in poor antenna performance. The display and/or touch component can include various conductive elements that can operate as RF shielding to block the electromagnetic fields generated by the antenna. In addition, an eddy current generated by an indium tin oxide (ITO) layer of a display or touch component of the device can also reduce the quality (Q) factor of the antenna.

Systems and methods in accordance with various embodiments of the present disclosure may overcome one or more of the aforementioned and other deficiencies experienced in conventional approaches for incorporating one or more antennas into an electronic device. In particular, various embodiments integrate an RF or NFC antenna with a display and/or touch component of the device. In some embodiments, the pattern of the RF or NFC antenna can be disposed on one or more layers of a display and/or touch component of the electronic device. For example, the display component can include ITO layers for scan and signal lines and the touch component can include ITO layers for drive and sense lines. In an embodiment, the RF or NFC antenna can be integrated with a display and/or touch component by interleaving the antenna between the conductors of one or more ITO layers of the display and/or touch component. First conductive elements of the RF or NFC antenna pattern can be etched onto a first ITO layer, second conductive elements of the antenna can be etched onto a second ITO layer, and conductive vias can be used to connect the first and second components to form the RF or NFC antenna. In other embodiments, the conductors of the ITO layers can be used to serve multiple purposes, such as forming portions of the RF or NFC antenna. For instance, the RF or NFC antenna can be formed by a portion of the scan lines and a portion of the signal lines of the display component or a portion of the drive lines and a portion of the sense lines of the touch component. Circuitry can be used to switch the lines between a first mode of operation, e.g., display or touch, and a second mode of operation, e.g., RFID or NFC. Using such techniques, an electronic device can be manufactured to enable RFID or NFC capability yet require fewer layers than conventional devices. This can reduce costs associated with incorporating RFID or NFC technology, such as by using fewer components and/or streamlining manufacturing processes. Further, the thickness of the device can be minimized and/or other elements can be added or existing elements (e.g., processor, memory, battery) can be increased for better performance.

Various other functions and advantages are described and suggested below in accordance with the various embodiments.

FIG. 1 illustrates an example approach of inter-device communication using RFID or NFC technology in accordance with an embodiment. In the example situation 100 of FIG. 1, a user 102 can be seen operating a computing device 104 in close proximity to a security card reader 106 that controls access to door 108. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The user is holding the device 104 such that the back of the device is facing the user and a display screen of the device (not shown) is facing the front of the security card reader 108. The display screen incorporates a plurality of capacitive touch sensors enabling the device to detect the user's fingertip touching points of the screen as input for the device. In other embodiments, the device may implement a different touch technology (e.g. resistive, optical, ultrasonic) or may not include any touch sensing capability. It should be understood that, while the components of the example device are described to be on a "front" of the device, there can be similar or alternative components on the "top," "side," or "back" of the device as well (or instead). Further, directions such as "top," "front," "side," and "back" are used for purposes of explanation and are not intended to require specific orientations unless otherwise stated.

In this example, the device 104 and the security card reader 106 each incorporate components to enable wireless communication via RFID or NFC. The user can activate RFID or NFC functionality on the device by pressing a switch of the device or starting up a user application for enabling RFID or NFC. The device can then be placed in close proximity with the security card reader, such as by touching the device to the reader or positioning the device up to 20 cm apart from the reader. When the device and reader are within a suitable range, the device and reader may communicate wirelessly to authenticate the identity of the user. If the identity of the user is validated, door 108 may automatically unlock to allow the user entry. While the device is operating according to RFID/NFC mode, the display and/or touch features of the device may be deactivated. However, the display and/or touch functionality may only be disabled for a short period of time due to RFID/NFC enabling quick inter-device connection and requiring no prior setup. In addition to security and identity authentication, RFID/NFC functionality can also enable the user to utilize the device for electronic payments, paperless ticketing, peer to peer data exchange (e.g., contact information, photos, videos, and other data), bootstrapping to other wireless communication systems (e.g., WiFi Direct, Bluetooth®), among other applications. Other applications for RFID or NFC should be apparent in light of the teachings and suggestions contained herein.

Figure 2:
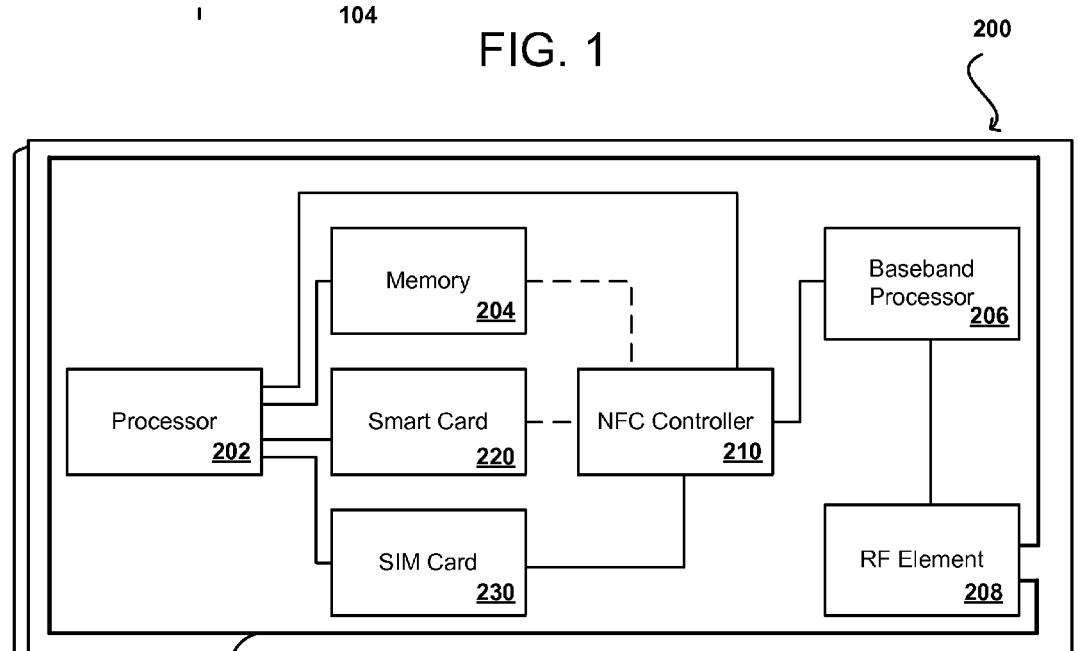
FIG. 2 illustrates an example of an RF or NFC system that can be used in accordance with an embodiment.

As discussed, an electronic device may require certain additional components to enable RFID or NFC functionality. FIG. 2 illustrates an example device 200 that can be used to perform various user actions via RFID or NFC, such as for security and identity authentication as depicted in FIG. 1 or other applications as suggested herein. The device may include a processor 202, memory 204, an RFID/NFC interface, and one or more secure elements (SE), such as a smart card 220, secure identity module (SIM) card 230, or a secure area in the memory 204 of the device. SEs can come in various form factors, including Universal Integrated Circuit Card (UICC) or SIM, integrated circuits or embedded secure elements (eSE), secure digital (SD) or MicroSD, stickers, tags, among others. The RFID/NFC interface may comprise an RFID or NFC contactless front-end (CLF), RF or NFC controller 210, and RF or NFC antenna 212. The CLF may refer to the surface of the device used to make contact with another RFID- or NFC-enabled device. For example, in the device 104 of FIG. 1, the CLF would correspond to the front of the device where the display screen is located. The RF or NFC antenna 212 may provide for near field communications at any suitable frequency band or bands, such as 13.56 MHz. The data transfer rate may be 106, 212, or 424 kbps. The RF or NFC controller 210 may utilize the RF or NFC antenna 212 to provide for wireless communication with another NFC-enabled tag, device, or system. The NFC controller may also redirect RF communications to a currently selected SE, such as the smart card 220, the SIM card 230, or the secure area in memory 204. There are various modes of operation for RFID or NFC, such as active mode and passive mode. In the active mode of communication, both RFID- or NFC-enabled devices or systems generate an RF signal on which data can be carried. In passive mode, one RFID- or NFC-enabled device generates an RF field and the second tag, device, or system uses load modulation to transfer data back to the active device.

Certain RFID- or NFC-based interactions may be limited to a secure environment. For example, electronic payment and ticketing and other similar applications may require processing of sensitive data (e.g., personal identity information, financial information), and processing such data in an unsecured environment may expose that data to a third party who may misuse the data. To solve this issue, RFID/NFC applications can be executed and saved in the memory of an SE, which can provide the security mechanisms necessary to comply with various standards. The SE may comprise a combination of hardware, software, interfaces, and protocols embedded in the electronic device to provide for secure storage. In particular, the SE may include software that supports the secure execution of applications and the secure storage of application data. The SE software may also support the secure loading of applications. An SE can be accessed and controlled by processor 202 or RF/NFC controller 210 internally as well as from the RF field externally.

In some embodiments, a device can include a baseband processor 206 and RF circuitry 208 that can be utilized by the RF/NFC controller in conjunction with the RF or NFC antenna for providing radio functionality. The wireless communication protocol may be based on ISO/IEC 18092 or ECMA-340. The baseband processor 206 and the RF element 208 may also be used by other components of the device to enable radio communication based on other standards and/or at other radio frequencies. In certain embodiments, the various elements of an RFID or NFC system can be separate, standalone components. In other embodiments, the RFID/NFC interface can be integrated with a processor of a device using a System on chip (SoC) implementation. In still other embodiments, the RFID/NFC interface can be incorporated as a SoC with other device functions, such as cellular networking, WiFi, and Bluetooth®, among others.

While there are generally no limitations on where the RF or NFC controller is placed within an electronic device, placement of the RF or NFC antenna may be limited by several factors. As is known in the art, an RF signal can be radiated effectively if the linear dimension of the antenna is comparable with the wavelength of the operating radio frequency. However, the wavelength at 13.56 MHz is 22.12 meters, and as a result, it can be difficult to form a true antenna for most RFID or NFC applications. Therefore, a small loop antenna resonating at the operational frequency is used to communicate via RF or NFC. An RF- or NFC-enabled device can operate according to passive communication mode, wherein an initiating device provides an electromagnetic field and a target device responds by modulating the existing field, and active communication mode, wherein both the initiating and target devices communicate by alternately generating their own fields. Since energizing (at least in passive mode) and communication are accomplished through antenna coils, it is important for a device to be equipped with a proper antenna for performing RF or NFC functions. For example, an RF or NFC antenna may be required, at a minimum, to generate a few microhenries of inductance and a few hundred pF of resonant capacitance for many RF or NFC applications.

In general, inductance is a function of the number of turns of a coil antenna, current, and magnetic flux, i.e.:

$$L = \frac{N\psi}{I},$$

where N is the number of turns of the coil antenna, I is the current, and ψ is the magnetic flux. Inductance for a multilayer rectangular loop coil can be calculated by:

$$L = \frac{0.0276(CN)^2}{1.908C + 9w_{cs}h_{cs}},$$

where N is the number of turns of the coil antenna, $C = w_c + l_c + 2h_{cs}$, $w_c$ is the width of the coil antenna, $l_c$ is the length of the coil antenna, $w_{cs}$ is the width of the cross section, and $h_{cs}$ is height of the cross section. In addition to these dimensional considerations for the design of an RF or NFC antenna, placement of the antenna within a device and materials surrounding the antenna must also be considered for a particular electronic device.

Figure 3C:
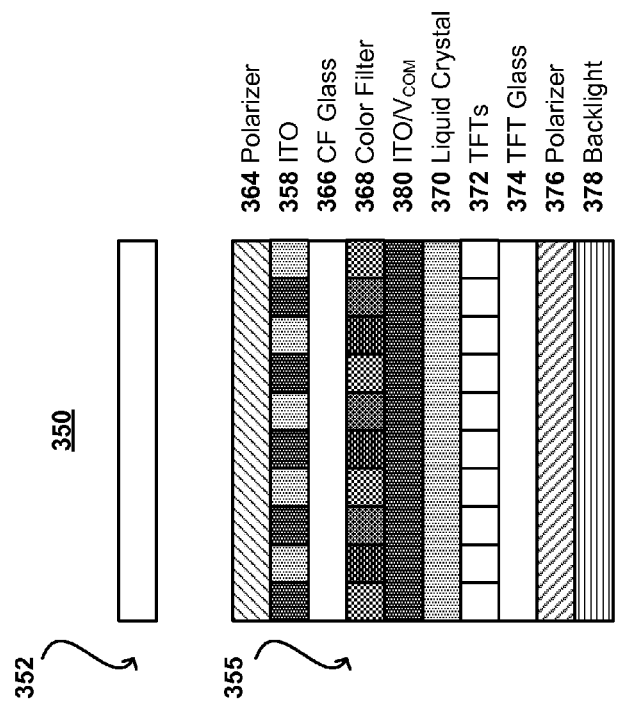

Systems and approaches in accordance with various embodiments integrate an RF or NFC antenna with a display and/or touch component of an electronic device. FIG. 3A-3C illustrate examples of liquid crystal display (LCD) modules (also sometimes referred to as LCD panels) and touch components (also sometimes referred to as touch panels) that can be used in accordance with various embodiments. Shown in FIG. 3A is an example 300 of a side view of a touch component 304 and LCD module 306. In this example, touch component 304 is based on projected capacitance. As mentioned, in other embodiments, other touch technology (e.g. resistive, optical, ultrasonic) may be used. The touch component 304 may include two layers 308 and 312 of metal lines or conductors that are separated by an insulator 310, such as glass, polyethylene terephthalate (PET), or other transparent insulating material. The conductors may be made of transparent ITO and are positioned perpendicular or substantially perpendicular (e.g., rows and columns) to one another so that a device can sense an X position and a Y position when touched. Also disposed on the top ITO layer 308 is a plurality of touch sensors (e.g., capacitors) each located at where the rows and columns of the conductors cross over each other while being separated by the insulating material. Other circuitry elements of the touch sensor, such as TFTs, other capacitors, among others, may also be disposed on one of and/or between the two ITO layers 308 and 312.

The LCD module 304 comprises a plurality of layers, including at least a top glass 316, liquid crystal 320, and bottom glass 324. The top and/or bottom glass can also be patterned with various layers of conducting materials, TFTs 322, and other circuit elements that allow the voltage across the liquid crystal to be varied to manipulate the orientation of the liquid crystal and control the brightness of the pixel. In particular, the TFT layer 322 may include a plurality of scan lines that are arranged perpendicular or substantially perpendicular to a plurality of signal lines which connect to TFTs and pixel electrodes proximate to where the lines cross over one another. The LCD module also includes polarizer layers 314 and 326 for filtering light matching the orientation of the respective polarizers, a color filter layer 318 for providing the display of color, and backlighting 328. Although an LCD module is described in this example, it will be appreciated that various display technologies can be used in other embodiments, including electronic ink (e-ink), organic light emitting diode (OLED), among others.

In this example, the cover glass 302, touch component 304, and display component 306 are separate and discrete components. The cover glass, touch component, and display component may be manufactured by separate vendors, and may be integrated by laminating the touch component to the top polarizer layer of the LCD module and attaching the cover glass. In other embodiments, the touch component can be integrated with a cover glass or LCD module. For example, the top ITO layer of a touch component can be deposited on the back of the cover glass (sometimes referred to as the "lens") and patterned to form the first layer of conductors (e.g., rows or columns) A thin insulator can be added to the bottom of the top ITO layer, and the bottom ITO layer can be deposited to the insulator and patterned to form the second layer of conductors (e.g., columns or rows). The touch component integrated with the cover glass can be laminated onto an LCD module. Such a configuration is sometimes referred to as "on-stack" or "sensor on lens."

In still other embodiments, the display component and the touch component can be integrated according to "on-cell" or "in-cell" configurations. A "cell" is the area between a top color filter glass and bottom TFT array glass of each pixel of a "touchscreen." As used herein, a "touchscreen" shall refer to a touch component that has been integrated with a display component, including discrete, on-stack, on-cell, or in-cell configurations. A touchscreen can be referred to as "on-cell" when layers of the touch component are incorporated within the display component but the ITO layers of the touch component are located above the color filter glass substrate. FIG. 3B illustrates an example 330 of a side view of an on-cell configuration of a touchscreen 335 that can be used in accordance with an embodiment. A conductive layer of ITO 342 can be deposited directly on the top layer of glass 346 of an LCD module and then patterned to form the conductors, TFTs, and/or other elements of the circuitry for the touch component. A thin insulating layer 340 can be applied, and a second ITO layer 338 can be deposited and patterned with the second layer of conductors, TFTs, and/or other circuitry elements. A top polarizing layer 344 can be applied on top, and the touchscreen is completed by adding the cover glass 332. As shown here, elements of the touch component, such as ITO layer 338, insulator 342, and ITO layer 342 are located within layers of the display component, i.e., between the top polarizer 344 and the top glass 346 of a display component. However, the ITO layers 338 and 342 of the touch component are located above the cell. That is, the ITO layers of the touch component are above the top glass 346 and bottom glass 354 of the display component.

A touchscreen can be referred to as "in-cell" when at least one of the ITO layers of the touch component is stacked between the top glass and the bottom glass of the display component. This can reduce the number of discrete layers, and may result in a thinner and less expensive touchscreen. FIG. 3C illustrates an example 350 of a side view of an in-cell configuration of a touchscreen 355 that can be used in accordance with an embodiment. The top ITO layer 358 of the touch component can be deposited directly on the top glass layer 366 of the display component, which can operate as the insulator between the two ITO layers of the touch component. Further, an ITO layer can be shared between the touch component and display component. For example, a single ITO layer 380 can be used to implement both $V_{COM}$ and a portion of the conductors for the touch component. $V_{COM}$ is a reference voltage for TFT LCDs. A display driver interface integrated circuit will drive the red, green, or blue (RGB) video amplitude for a pixel to a source of the pixel TFT when its gate is open, and a storage capacitor is formed between the TFT's drain and the $V_{COM}$ reference potential. The stored voltage creates an electric field across the liquid crystal material that will then act as a valve to pass the brightness level from the LCD backlight. In certain LCDs, the $V_{COM}$ layer may comprise a non-patterned ITO layer that extends across the whole active area of the LCD module. In this configuration, however, the $V_{COM}$ layer is patterned to form the conductors for one of the rows or columns of the touch matrix so that this ITO layer can be used by both the touch component and the display component.

Figure 4A:
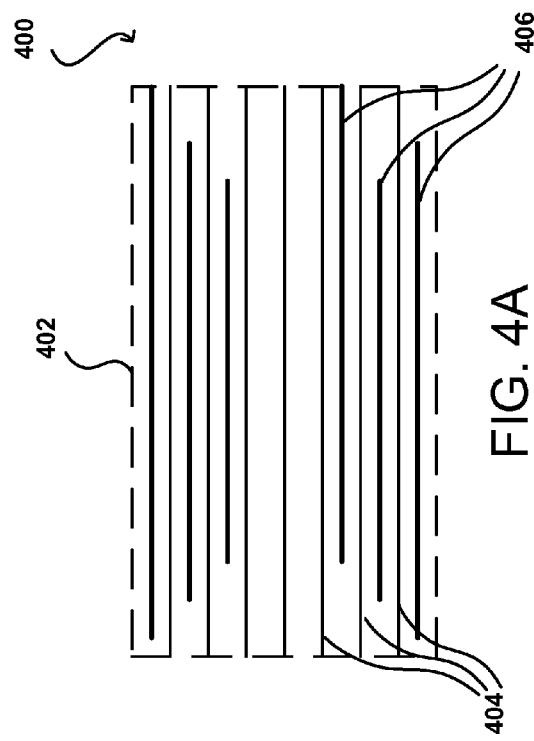

Approaches in accordance with various embodiments incorporate an RF or NFC antenna into a display and/or touch component of an electronic device, such as one or more of the ITO layers of the display and/or touch component of the device. FIGS. 4A-4D illustrate an approach for integrating an RF or NFC antenna with a display component and/or touch component. FIG. 4A illustrates an example 400 of a top view of a portion of an RF or NFC antenna being integrated during fabrication of a display or touch component of an electronic device. First conductors 404 and second conductors 406 can be seen etched onto a substrate 402. The conductors comprise a transparent conductive material, such as indium tin oxide. The conductors can be etched onto a substrate by coating the substrate with a thin layer of ITO, applying a mask of the desired pattern (e.g., silk-screening or photolithography) to the coated substrate, and etching unmasked portions chemically. Alternatively, or in addition, a photoresist process can be used in the fabrication of the conductors. In this example, the substrate corresponds to the bottom glass substrate of a display component, such as glass substrate 324 in FIG. 3A, 354 in FIG. 3B, or 374 in FIG. 3C; the conductors 404 correspond to the scan lines of the circuitry for the display component; and the conductors 406 correspond to components of an RF or NFC antenna. It will be appreciated that the conductors 404 could also correspond to signal lines of the circuitry for the display component. In another embodiment, the substrate may correspond to the top glass substrate of a display component, such as glass substrate 346 of FIG. 3B or 366 of FIG. 3C, and the first conductors may correspond to the drive lines or the sense lines of a touch component. The substrate could also be a thin film or laminate to the extent the RF or NFC antenna is incorporated in a discrete touch component, such as touch component 304 of FIG. 3A. Various other examples should be apparent in light of the teachings and suggestions contained herein.

Figure 4B:
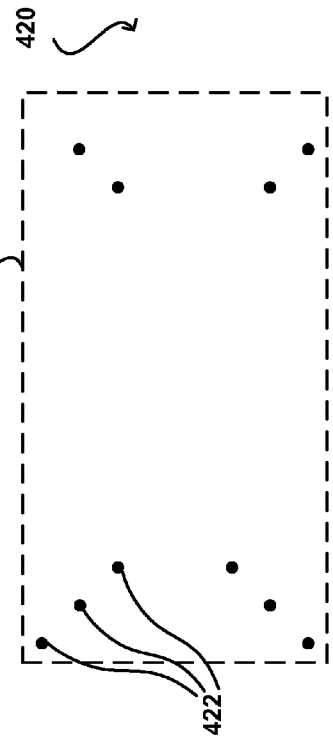

FIG. 4B illustrates an example 420 of a top view of another portion of an RF or NFC antenna being integrated during the manufacture of the pixel array of a display component or touch component of an electronic device. In this example, a clear insulating material is applied to the first layer of the ITO layer of FIG. 4A. Conductive vias 422 are then formed at various points in the substrate 402 corresponding to certain terminal points of the second conductors 406 of FIG. 4A. In certain embodiments, the substrate can be used as the insulator between two ITO layers. For example, FIG. 3C illustrates an example of a first ITO layer 358 and a second ITO layer (and $V_{COM}$ layer) 380 stacked between top glass substrate 366 and color filter 368. In such embodiments, it may not be necessary to apply an additional insulating material. Instead, conductive vias can be formed within the substrate to connect ITO layers deposited on each side of the substrate. It will be appreciated that other embodiments may utilize a substrate as an insulating layer by etching two ITO layers on opposite surfaces of the substrate.

FIG. 4C illustrates an example 440 of a top view of another portion of an RF or NFC antenna being integrated during fabrication of the pixel array of a display component or touch component of an electronic device. Third conductors 442 and fourth conductors 446, which are perpendicular or substantially perpendicular to the conductors 404 and 406 of FIG. 4A, are formed on substrate 402 using a similar etching process as discussed in FIG. 4A. FIG. 4D illustrates an example 460 of a top view of the RF or NFC antenna (in bold lines) and a display or touch ITO matrix (in lighter lines) after the processing steps of 400 of FIG. 4A, 420 of FIG. 4B, and 440 of FIG. 4C. In this example, vertical conductors 442 correspond to the signal lines of a display component, horizontal conductors 404 correspond to the scan lines, and loop structure 462 can be utilized as an RF or NFC antenna. The positive electrode 464 and negative electrode 466 of RF or NFC antenna 462 can be connected to an anisotropic conductive film (ACF), alone or in addition to the input and output signals of the display and/or touch component, which can be used to interconnect with the printed circuit board of the electronic device. The electrodes 464 and 466 can ultimately be routed to an RF or NFC controller. In other embodiments, conductors 414 and 416 may correspond to the drive and sense lines (or vice versa) of the circuitry for a touch component. Although not shown here, it will be appreciated that other components of the circuitry for the display component (or touch component), such as TFTs, capacitors, pixel electrodes, transistor electrodes, among others, can also be fabricated at least in part during manufacture of the conducting lines and RF or NFC antenna.

By using the approach of FIGS. 4A-4D, an RF or NFC antenna may be designed and positioned at several (X,Y) locations within an electronic device. While conventional antennas may be limited to locations outside the area corresponding to a display or touchscreen, the RF or NFC antenna or portions thereof can overlap with the display or touchscreen using the teachings disclosed herein. That is, the metal traces forming the RF or NFC antenna can interleave the metal traces utilized for the display or touch component of an electronic device. This can enable for better mating between RF- or NFC-enabled devices and result in better connections. Further, the pattern and dimensions of the RF or NFC antenna can be varied in other embodiments, such as having fewer or a greater number of loops; shorter or greater distance between loops; smaller or greater length, width, or height; smaller or greater loop length, width, or height; smaller or greater wire diameter, among other possibilities. The RF or NFC antenna may also be configured using various shapes, such as squares, polygons, polygons with one or more curved edges, circles, ellipses, among others.

Figure 5C:
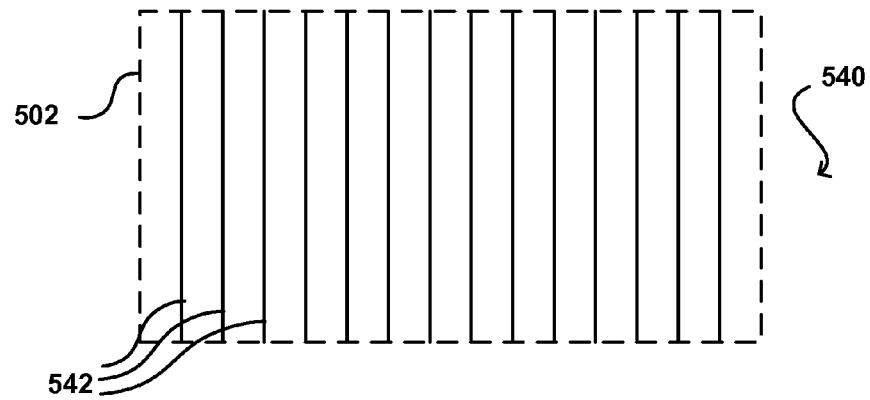

In some embodiments, ITO conducting lines can be used for multiple purposes, such as a scan/signal line for a display component or drive/sense line for a touch component and as a component of an RF or NFC antenna. FIGS. 5A-5D illustrate such an approach for incorporating an RF or NFC antenna with a display component and/or touch component of an electronic device. FIG. 5A illustrates an example 500 of a top view of a portion of an RF or NFC antenna being integrated during manufacture of a display or touch component of an electronic device. Conductors 504 are etched onto a substrate 502 using a similar technique as that discussed with respect to FIGS. 4A and 4C. As discussed throughout herein, the conductors may be scan/signal lines of a display component or drive/sense lines of a touch component. During the etching process, certain of the conductors 504 may include gaps for deposition of circuit elements 506. Circuit elements 506 comprise switches that are normally on when the conductors 504 are used as scan or signal lines for a display component or drive or sense lines for a touch component. When the display component and/or touch component are turned off and RF or NFC functionality is enabled, the switches are turned off such that the conductor is segmented and capable of being utilized as part of an RF or NFC antenna. FIG. 5B illustrates an example 520 of a top view of an RF or NFC antenna being integrated during fabrication of the display component or touch component of an electronic device. In this example, a clear insulating material is applied to the first layer of the ITO layer of FIG. 5A using a similar technique as discussed with respect to FIG. 4B. Openings can be formed at various points in the substrate 502 corresponding to points of the conductors 504 of FIG. 5A. Circuit elements 522 can be deposited in these openings. In this example, circuit elements 522 are normally off until the display component and/or touch component are deactivated and RF or NFC functionality is activated. Circuit elements 506 and 522 work in conjunction to segment and connect existing scan/signal lines of a display component or drive/sense lines of a touch component to form an RF or NFC antenna pattern. In other embodiments, multiplexers, single pole double throw (SDPT) switches, and similar circuits can be used to enable multiple uses of the conductors of a pixel matrix of a display or touch component.

Figure 5D:
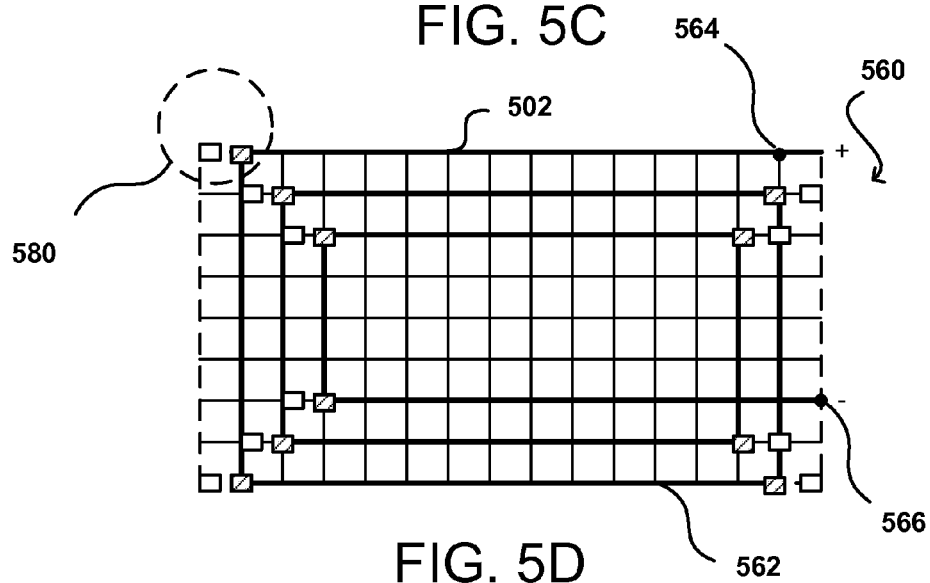

FIG. 5C illustrates an example 540 of another portion of an RF or NFC antenna being integrated with a display component or touch component of an electronic device. Conductors 542, which are perpendicular (or substantially perpendicular) to the conductors 504, are formed on substrate 502 using a similar etching process as discussed with respect to FIGS. 4A, 4C, and 5A. FIG. 5D illustrates an example 560 of a top view of an RF or NFC antenna (bold lines) and a display matrix or touch matrix (bold lines and light lines) of an electronic device after the processing steps of 500 of FIG. 5A, 520 of FIG. 5B, and 540 of FIG. 5C. In this example, the vertical conductors may correspond to the signal lines of a display component and the horizontal conductors correspond to the scan lines of the display component (or vice versa). In other embodiments, the vertical conductors may correspond to the drive lines and the horizontal conductors may correspond to the sense lines of a touch component (or vice versa). When the circuit elements are deactivated, the conductors operate as scan/signal lines or drive/sense lines. When the circuit elements are activated, the conductors form a loop structure 562 that can be utilized as an RF or NFC antenna. The positive electrode 564 and negative electrode 566 of RF or NFC antenna 562 can be routed to an RF or NFC controller for communicating wirelessly with another RF- or NFC-enabled tag, device, or system.

Figure 5E:
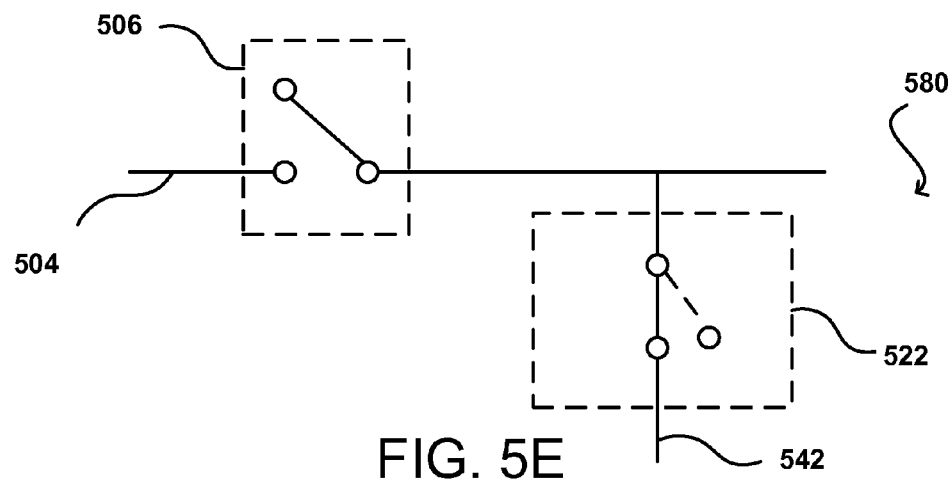

FIG. 5E illustrates an example 580 of a high-level diagram of the circuit used to enable multi-purpose functionality for scan/signal lines of a display component or drive/sense lines of a touch component. In this example, circuit elements 506 and 522, which respectively correspond to a normally on switch and a normally off switch have been activated. Activation of circuit element 506 results in segmentation of the scan/signal or drive/sense line 504 from the rest of the display or touch circuitry. Concurrent with activation of circuit element 506 is the turning on of circuit element 522, which connects conductors 504 and 542 to form a portion of an RF or NFC antenna. An advantage of the approach of FIGS. 5A-5E to re-purpose the scan/signal or drive/sense lines is to reduce interference from conductive elements surrounding the RF or NFC antenna. For example, the scan/signal or drive/sense lines of a display or touch component interleaved with the RF or NFC antenna may cause the RF or NFC antenna perform less than optimally even when those conductive elements are not active. Although, the RF or NFC antenna of the example FIGS. 5A-5E uses a single ITO metal trace to form each segment of the antenna, it will be appreciated that other embodiments may vary from such an approach. For example, in at least some embodiments, multiple ITO metal traces and additional circuitry can be used to form each segment of the antenna. Two or more horizontal conductors can be combined to form a single horizontal component of the RF or NFC antenna pattern. The combined horizontal component may "turn" to join two or more vertical ITO conductors to form a vertical component of the RF or NFC antenna. Such an approach can increase the effective "diameter" of each segment of the RF or NFC antenna. As is known to one of ordinary skill in the art, the diameter of a conductor can be inversely proportional to DC resistance. In particular, the DC resistance for a conductor with a uniform cross-sectional area is related according to:

$$R_{DC} = \frac{1}{\sigma S} = \frac{1}{\sigma \pi r_c^2},$$

where l is the total length of the conductor, a is the conductivity of the wire, S is the cross-sectional area $\pi r^2$ of the antenna, and $r_c$ is the radius of the conductor. A higher Q for the antenna can be achieved by using a larger diameter for the conductor, such as by combining multiple ITO traces to form a segment of the antenna. Other variations from the approach of FIGS. 5A-5E can be made as will be appreciated by those of ordinary skill in the art.

In at least some embodiments, a combination of the approaches of FIGS. 4A-4D and FIGS. 5A-5E can be used to fabricate the RF or NFC antenna within a display component or touch component of an electronic device. For example, one or more segments of the RF or NFC antenna can comprise separate conductors as in the approach of FIGS. 4A-4D and the remaining segments of the RF or NFC antenna can comprise the scan or signal lines of the display component or the drive and sense lines of the touch component as in the approach of FIGS. 5A-5E. Such an approach can reduce some of the circuitry necessary to enable the conductors of the display component or touch component to be used for multiple purposes. For instance, the horizontal segments (or vertical segments) of the RF or NFC antenna can be formed from the scan/signal lines of the display component or the drive/sense lines of the touch component, and the vertical segments of the RF or NFC antenna can be formed from separate and discrete conductors. This approach can eliminate the need for the circuitry needed to keep the scan/signal lines or drive/sense lines disconnected during operation of the touchscreen and to connect the scan/signal lines or the drive/sense lines during RF or NFC operation. Further, this "hybrid" approach can improve the manufacturing process by eliminating certain processing steps during the fabrication of the display component or the touch component.

Figure 6:
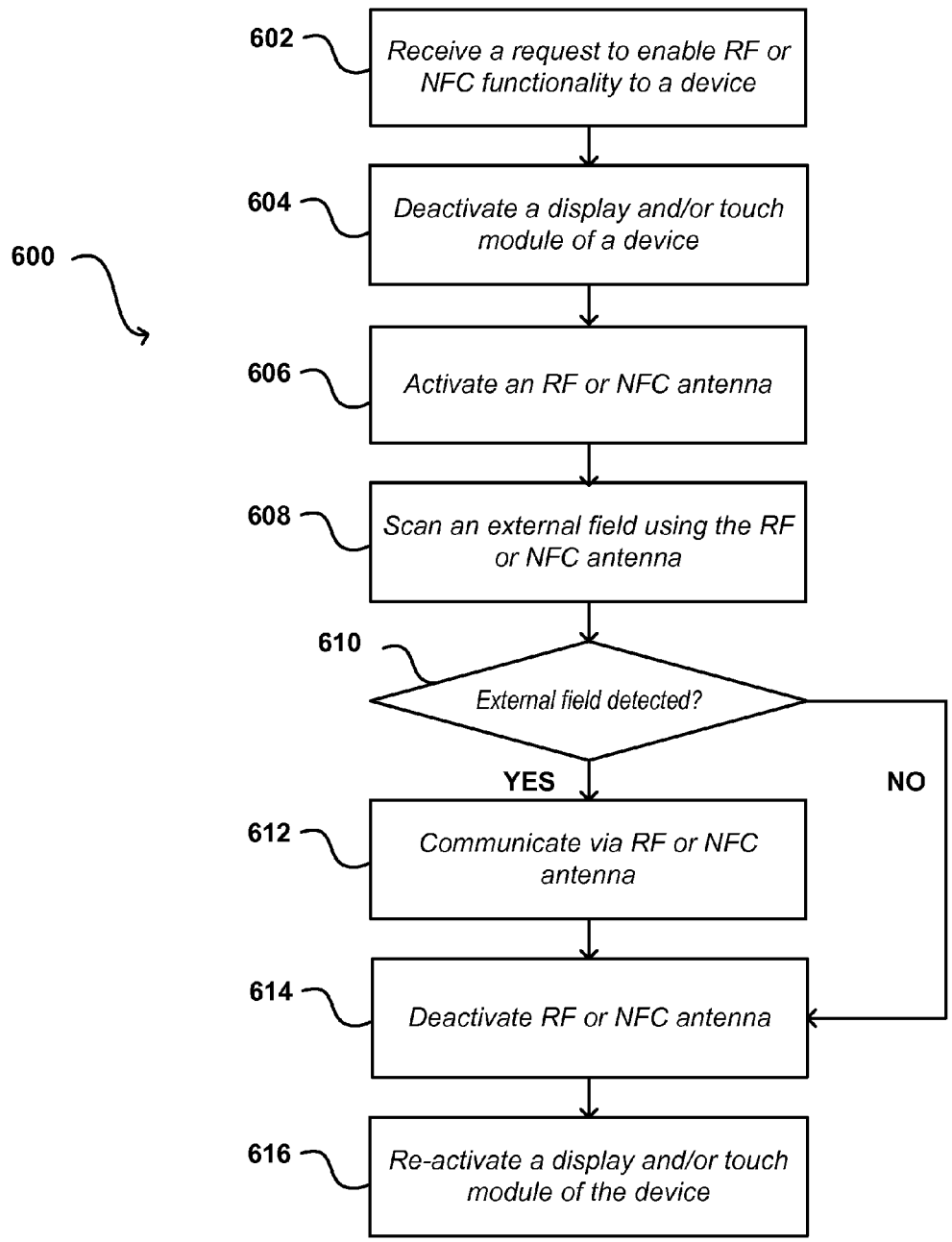
FIG. 6 illustrates an example process for utilizing NFC technology in accordance with an embodiment.

FIG. 6 illustrates an example process 600 for utilizing RF or NFC technology in an RF- or NFC-enabled electronic device in accordance with an embodiment. It should be understood that, for any process discussed herein, there can be additional, fewer, or alternative steps performed in similar or alternative orders, or in parallel, within the scope of the various embodiments unless otherwise stated. The process may begin by a user requesting the device to perform an RF or NFC function 602, such as by pressing a button of the device configured to activate the RF or NFC antenna or to start up a user application that relies on RF or NFC. Examples of RF or NFC functions include processing of an electronic payment or electronic ticket, exchanging data with another RF- or NFC-enabled tag, device or system, authenticating the user's identity for access to a secured device, system, or location, initiating wireless communications for a second wireless communications technology, such as cellular, Wi-Fi, or Bluetooth®, among other possibilities. In this example, a display and/or touch component of the device may be deactivated 604 upon the device receiving a request to perform the RF or NFC function. In other embodiments, the display and/or touch component can be operated concurrently with RF or NFC operation, such as by performing RF or NFC functions during a low V_SYNC state of the display component. In still other embodiments, RF or NFC operation can occur on a low V_SYNC state at various phases of an RF or NFC protocol, such as during the initial acquisition state, and the display component and/or touch component may be deactivated at subsequent stages of the RF or NFC protocol, such as during the data communications and termination phases.

The process may continue with activation of the RF or NFC antenna 606. This can involve simply powering on the RF or NFC antenna if the antenna is composed of conductors independent of other device functionality. If one or more segments of the RF or NFC antenna is used for multiple purposes, such as for the scan/signal lines of the display component or the drive/sense lines of the touch component, activation of the RF or NFC antenna can include sending a signal to a controller or other circuitry to disconnect or segment the conductors used to form the RF or NFC antenna from other elements of the device, such as the display component or the touch component, and and/or to connect other conductors used to form other portions of the RF or NFC antenna. After the RF or NFC antenna is operational, the RF or NFC antenna can be used to detect an external magnetic field within its proximity 608. If an external field is detected 610, wireless communications can commence via RF or NFC 612, and may include the following phases: initial acquisition, data communications, and termination. After the RF or NFC transaction is concluded, the RF or NFC antenna may be deactivated 614. This can include sending a signal to the circuitry to reconnect those conductors that were used to form the RF or NFC antenna previously segmented or disconnected and to disconnect the other conductors previously connected to form other portions of the RF or NFC antenna. Deactivation of the RF or NFC antenna can also include powering down the RF or NFC antenna and related circuit elements. After the RF or NFC antenna is deactivated, the display and/or touch component can be reactivated 616.

Although the example process 600 assumes that display and/or touch operation is a default state of a computing device, it will be appreciated that RF or NFC operation can be the default state in certain embodiments. For example, in one embodiment, when the battery life of a computing device is low such that the operating system of the device has been shut down, the computing device may switch from operating in display and/or touch mode to RF or NFC mode. In this state, the computing device may be utilized to communicate via RF or NFC passively wherein the computing device can be used to modulate the electromagnetic field generated by an active RF or NFC-enabled device or system. In this manner, the device can still serve many functions despite low battery life.

Figure 7:
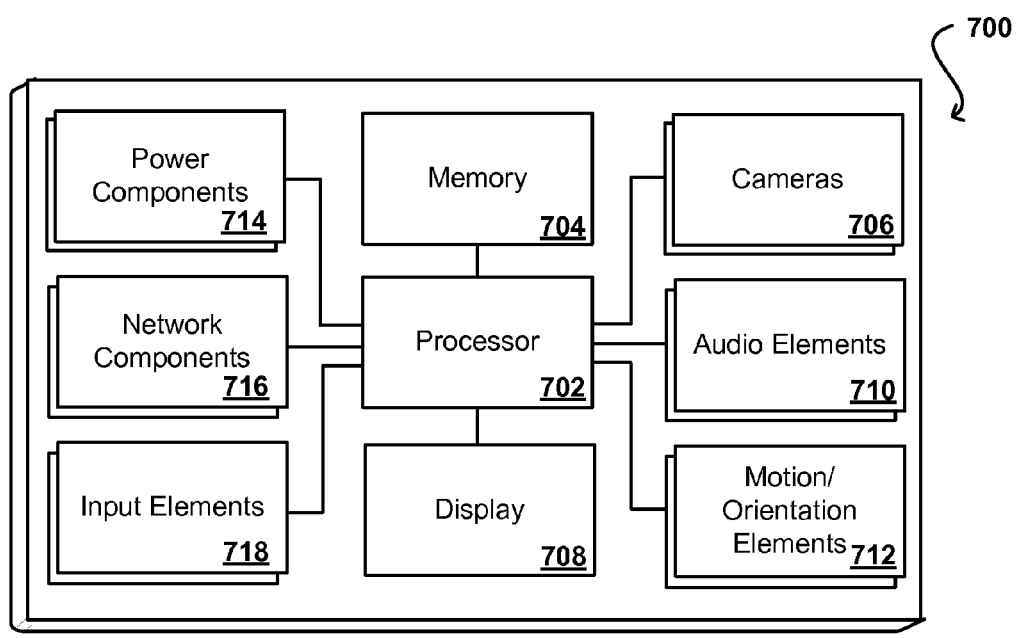
FIG. 7 illustrates an example configuration of components of a computing device such as that illustrated in FIG. 2.

FIG. 7 illustrates a logical arrangement of a set of general components of an example computing device 700 such as the device 200 described with respect to FIG. 2. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 708, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. The device may include one or more cameras or image sensors 706 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 714 known in the art for providing power to a computing device, which can include capacitive charging elements for use with a power pad or similar device. The computing device can include one or more communication elements or networking sub-systems 716, such as a Wi-Fi, Bluetooth, NFC, RF, wired, or wireless communication system. The device in many embodiments can communicate with a network, such as the Internet, and may be able to communicate with other such devices. In some embodiments the device can include at least one additional input device 718 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include one or more orientation and/or motion sensors 712. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

In some embodiments, the device 700 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 700 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 700 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A touchscreen, comprising:
   a liquid crystal display (LCD) panel including a plurality of scan lines that are arranged at least substantially in parallel, a plurality of signal lines that are arranged at least substantially in parallel, and a first insulating layer interposed between the plurality of scan lines and the plurality of signal lines, the plurality of scan lines arranged at least substantially perpendicular to the plurality of signal lines;
   a capacitive touch panel including a plurality of drive lines that are arranged at least substantially in parallel, a plurality of sense lines that are arranged at least substantially in parallel, and a second insulating layer disposed between the plurality of drive lines and the plurality of sense lines, the plurality of drive lines arranged at least substantially perpendicular to the plurality of sense lines; and
   a near field communications (NFC) antenna disposed on at least one of: (a) a first layer corresponding to the plurality of scan lines and a second layer corresponding to the plurality of signal lines, one or more first segments of the NFC antenna arranged at least substantially in parallel with, and in between, at least a subset of the plurality of scan lines and one or more second segments of the NFC antenna arranged at least substantially in parallel with, and in between, at least a subset of the plurality of signal lines, the one or more first segments of the NFC antenna being electrically connected to the one or more second segments of the NFC antenna using first conductive vias disposed within the first insulating layer; or (b) a third layer corresponding to the plurality of drive lines and a fourth layer corresponding to the plurality of sense lines, the one or more first segments of the NFC antenna arranged at least substantially in parallel with, and in between, at least a subset of the plurality of drive lines and the one or more second segments of the NFC antenna arranged at least substantially in parallel with, and in between, at least a subset of the plurality of sense lines, the one or more first segments of the NFC antenna being electrically connected to the one or more second segments of the NFC antenna using second conductive vias disposed within the second insulating layer.

2. The touchscreen of claim 1, wherein one or more segments of the NFC antenna are each formed respectively from one or more conductive lines that are distinct from the plurality of scan lines, the plurality of signal lines, the plurality of drive lines, and the plurality of sense lines.

3. The touchscreen of claim 1, wherein one or more segments of the NFC antenna are each formed respectively from at least one of: (a) one or more scan lines of the plurality of scan lines, (b) one or more signal lines of the plurality of signal lines, (c) one or more drive lines of the plurality of drive lines, or (d) one or more sense lines of the plurality of sense lines.

4. The touchscreen of claim 3, wherein an NFC function is performed during a low V_SYNC state of the LCD panel in a first mode of operation of the touchscreen and a touch function is performed during the low V_SYNC state in a second mode of operation of the touchscreen.

5. A computing device, comprising:
a processor;
a memory device;
a display component including a first plurality of conductive lines, a second plurality of conductive lines, and a first insulating layer interposed between the first plurality of conductive lines and the second plurality of conductive lines;
a touch component including a third plurality of conductive lines, a fourth plurality of conductive lines, and a second insulating layer interposed between the third plurality of conductive lines and the fourth plurality of conductive lines; and
a radio frequency (RF) antenna disposed on at least one of: (a) a first layer corresponding to the first plurality of conductive lines and a second layer corresponding to the second plurality of conductive lines, one or more first segments of the RF antenna being connected to one or more second segments of the RF antenna through the first insulating layer; or (b) a third layer corresponding to the third plurality of conductive lines and a fourth layer corresponding to the fourth plurality of conductive lines, the one or more first segments of the RF antenna being connected to the one or more second segments of the RF antenna through the second insulating layer.

6. The computing device of claim 5, wherein one or more segments of the RF antenna are each respectively formed from one or more of a fifth plurality of conductive lines.

7. The computing device of claim 6, further comprising:
a plurality of conductive vias each respectively connecting the one or more segments of the RF antenna.

8. The computing device of claim 5, wherein one or more segments of the RF antenna are each respectively formed from at least one of: (a) one or more of the first plurality of conductive lines; (b) one or more of a the second plurality of conductive lines; (c) one or more of the third plurality of conductive lines; or (d) one or more of the fourth plurality of conductive lines.

9. The computing device of claim 8, further comprising:
one or more switches configured to connect at least one conductive line to at least one of the display component or the touch component in a first state and disconnect the at least one conductive line from the at least one of the display component or the touch component in a second state.

10. The computing device of claim 8, further comprising:
one or more switches configured to connect at least one first conductive line to at least one second conductive line of at least one of the display component or the touch component in a first state and disconnect the at least one first conductive line from the at least one second conductive line in a second state.

11. The computing device of claim 8, wherein at least one segment of the RF antenna comprises at least one of: (a) a first conductive line of the first plurality of conductive lines; (b) a second conductive line of the second plurality of conductive lines; (c) a third conductive line of the third plurality of conductive lines; or (d) a fourth conductive line of the fourth plurality of conductive lines.

12. The computing device of claim 5, wherein one or more segments of the RF antenna interleave at least one of: (a) a subset of the first plurality of conductive lines; (b) a subset of the second plurality of conductive lines; (c) a subset of the third plurality of conductive lines; or (d) a subset of the fourth plurality of conductive lines.

13. The computing device of claim 5, wherein the memory device includes instructions that, when executed by the processor, cause the computing device to:
receive a request to perform an RF function;
deactivate the display component and the touch component; and
activate the RF antenna.

14. The computing device of claim 13, wherein the instructions when executed further cause the computing device to:
perform one or more RF functions;
deactivate the RF antenna; and
reactivate the display component and the touch component.

15. The computing device of claim 5, wherein an RF function is performed during a low V_SYNC state of the display component in a first mode of operation of the computing device and a touch function is performed during the low V_SYNC state in a second mode of operation of the computing device.

16. The computing device of claim 5, wherein the computing device is configured to operate in an RF mode during a low power state of the computing device and the display component and the touch component are deactivated in the low power state of the computing device.

17. A method for assembling a computing device, comprising:
disposing a first plurality of conductive lines on a surface, at least a first subset of the first plurality of conductive lines forming a first portion of an RF antenna;
disposing an insulation layer on the first plurality of conductive lines; and
disposing a second plurality of conductive lines on the insulation layer, at least a first subset of the second plurality of conductive lines forming a second portion of the RF antenna, one or more segments of the first portion of the RF antenna being connected to one or more segments of the second portion of the RF antenna through the insulation layer, wherein at least one of: (a) at least a second subset of the first plurality of conductive lines and at least a second subset of the second plurality of conductive lines form scan lines and signal lines of a display component, respectively; or (b) the at least the second subset of the first plurality of conductive lines and the at least the second subset of the second plurality of conductive lines form drive lines and sense lines of a touch component, respectively.

18. The method of claim 17, wherein one or more segments of the RF antenna are each respectively formed from at least one of: (a) one or more scan lines of a subset of the scan lines of the display component, (b) one or more signal lines of a subset of the signal lines of the display component, (c) one or more drive lines of a subset of the drive lines of the touch component, or (d) one or more sense lines of a subset of the sense lines of the touch component.

19. The method of claim 18, further comprising:
disposing circuitry enabling the one or more segments of the RF antenna to perform an RF function in a first mode of operation and to perform one of a display function or a touch function in a second mode of operation.

20. The method of claim 17, wherein at least one segment of the RF antenna comprises a plurality of: (a) a subset of the scan lines of the display component, (b) a subset of the signal lines of the display component, (c) a subset of the drive lines of the touch component, or (d) a subset of the sense lines of the touch component.

* * * * *